United States Patent
Lechner

[11] 3,719,413
[45] March 6, 1973

[54] INVERTED TELEPHOTO PROJECTION LENSES
[75] Inventor: Hadrian B. Lechner, North Chili, N.Y.
[73] Assignee: Bausch & Lomb Incorporated, Rochester, N.Y.
[22] Filed: Feb. 11, 1972
[21] Appl. No.: 225,493

[52] U.S. Cl............................350/214, 350/175 ML
[51] Int. Cl.................................................G02b 9/64
[58] Field of Search.......................................350/214

[56] References Cited
UNITED STATES PATENTS
3,551,031  12/1970  Grey....................................350/214
3,656,839  4/1972  Trotta..................................350/214

Primary Examiner—John K. Corbin
Attorney—Frank C. Parker et al.

[57] ABSTRACT

An improved inverted telephoto lens having a seven element positive group separated from a two element negative group.

3 Claims, 1 Drawing Figure

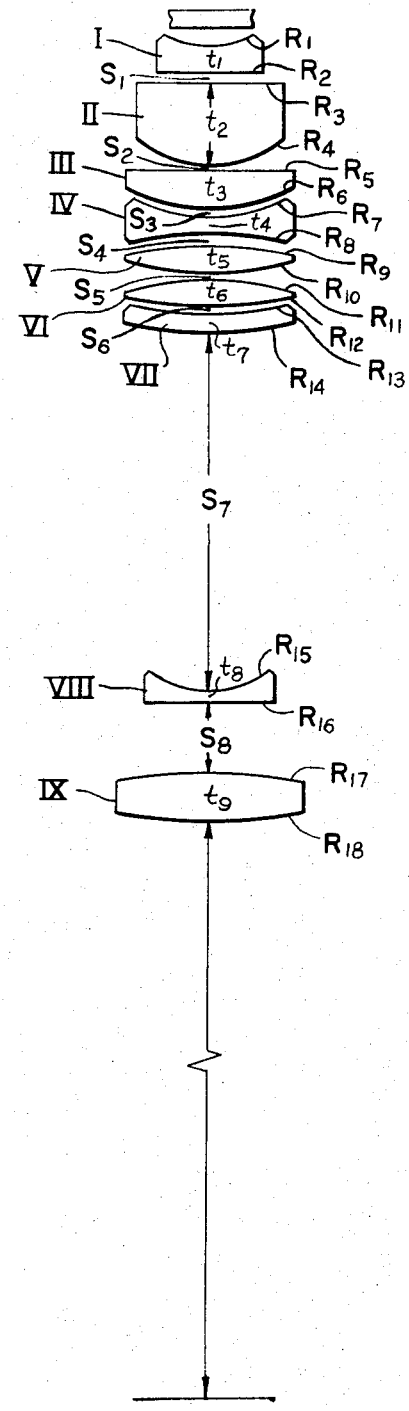

INVERTED TELEPHOTO PROJECTION LENSES

BACKGROUND OF THE INVENTION

1. Field of the Invention

The invention lies in the field of lens designs and more particularly in the field of multiple component lens designs.

2. Description of the Prior Art

The lens of my invention is an improvement on that disclosed in U.S. Pat. No. 3,551,031 to D.S. Grey in that the first seven elements of that design have been retained substantially intact to effect an important saving in manufacturing while at the same time permitting entirely different ends to be achieved.

SUMMARY OF THE INVENTION

Like the above mentioned design my lens includes a first negative element which is preferably a planoconcave lens I followed by a relatively thick planoconvex lens II. Lenses III, IV and V constitute a group which are respectively biconvex, biconcave and biconvex. These in turn are followed by a biconvex lens VI and a negative meniscus lens VII concave toward the short conjugate. Each of the lenses I–VII are airspaced, none of them being in mutual contact.

A wide space separates lens VII from lens VIII, said space being the characteristic wide separation of the positive group from the negative group in inverted telephoto lenses, lenses VIII and IX constituting the negative group. Lens VIII is a negative meniscus concave toward the short conjugate and lens IX is a biconvex lens of relatively wide aperture. Lenses VIII and IX are somewhat widely airspaced from one another.

BRIEF DESCRIPTION OF THE DRAWING

The drawing is a schematic optical diagram of the lens.

DESCRIPTION OF THE PREFERRED EMBODIMENT

The preferred lens provides an image resolution of approximately 5 lines per millimeter on a suitable projection screen at a magnification of 90×, a projection half-angle of 14°, and a relative aperture of $f/1.6$, this corresponding to 450 lines per millimeter in the object plane. The lens is well corrected for both the chromatic and non-chromatic aberrations. The individual elements are fabricated with relatively shallow radii which renders the lens relatively easy to manufacture. This fact also permits an optimum sharing of the corrective functions among the various elements.

Although optical glass of very fine quality is specified, the glasses chosen are of moderate cost. The lens is additionally designed for a relatively simple alignment procedure and the design is conveniently tolerant of slight variations in alignment.

The lens is designed to work with a standard cover glass in the object conjugate.

The construction data for my lens design are given in Table I below wherein the radii R, thicknesses $t$, and spaces S are given in ratio to the focal length of the lens taken as unity, each value being subnumerated in increasing sequence from the short conjugate toward the long. The radii are taken as centered on the short conjugate side of the lens, the short conjugate side being the side toward the object plane when the lens is used as a microfiche projection lens. Negative radii are taken as centered on the long conjugate side.

The optical glass characteristics, refractive indices, $n_D$, and the dispersion values, $\nu$, are likewise subnumerated in increasing order from the short conjugate side toward the long. It is thought that other optical glasses could be used provided their refractive indices were held within 0.002 of those listed and that their dispersion indices were held within two units.

TABLE I

| | | | | |
|---|---|---|---|---|
| I | $R_1$ | 1.554f | $t_1$ | 0.359f |
| | $R_2$ | ∞ | $t_2$ | 0.930f |
| II | $R_3$ | ∞ | $t_3$ | 0.454f |
| III | $R_4$ | 1.272f | $t_4$ | 0.194f |
| | $R_5$ | 34.2f | $t_5$ | 0.315f |
| IV | $R_6$ | 1.890f | $t_6$ | 0.328f |
| | $R_7$ | 1.890f | $t_7$ | 0.195f |
| V | $-R_8$ | 3.853f | $t_8$ | 0.116f |
| | $-R_9$ | 4.184f | $t_9$ | 0.526f |
| VI | $R_{10}$ | 3.771f | $S_1$ | 0.019f |
| | $-R_{11}$ | 3.469f | $S_2$ | 0.143f |
| VII | $R_{12}$ | 6.398f | $S_3$ | 0.006f |
| | $R_{13}$ | 3.591f | $S_4$ | 0.174f |
| VIII | $R_{14}$ | 6.298f | $S_5$ | 0.060f |
| | $R_{15}$ | 0.972f | $S_6$ | 0.216f |
| IX | $R_{16}$ | 18.537f | $S_7$ | 3.636f |
| | $-R_{17}$ | 26.801f | $S_8$ | 1.349f |
| | $R_{18}$ | 6.257f | | |
| | $n_{D1}$ | 1.720 | $\nu_1$ | 29.3 |
| | $n_{D2}$ | 1.691 | $\nu_2$ | 54.8 |
| | $n_{D3}$ | 1.691 | $\nu_3$ | 54.8 |
| | $n_{D4}$ | 1.720 | $\nu_4$ | 29.3 |
| | $n_{D5}$ | 1.691 | $\nu_5$ | 54.8 |
| | $n_{D6}$ | 1.691 | $\nu_6$ | 54.8 |
| | $n_{D7}$ | 1.720 | $\nu_7$ | 29.3 |
| | $n_{D8}$ | 1.517 | $\nu_8$ | 64.5 |
| | $n_{D9}$ | 1.720 | $\nu_9$ | 46.0 |

It is within the contemplation of optical manufacturing methods that slight variations in the above construction values may be tolerated with the understanding that by certain well known practices, skilled optical technicians will be able to assemble and adjust the overall lens to a useful performance level, although possibly to somewhat less than ideal standards. Such variations would be regarded as tolerable if they were to fall within the ranges of values listed in Table II below:

TABLE II

| | | |
|---|---|---|
| 1.552f | $<R_1<$ | 1.555f |
| 199f | $<R_2<$ | −100f |
| 100f | $<R_3<$ | −100f |
| 1.269f | $<R_4<$ | 1.275f |
| 32.99f | $<R_5<$ | 35.26f |
| 1.885f | $<R_6<$ | 1.893f |
| 1.886f | $<R_7<$ | 1.892f |
| 3.833f | $<-R_8<$ | 3.872f |
| 4.163f | $<-R_9<$ | 4.201f |
| 3.753f | $<R_{10}<$ | 3.787f |
| 3.457f | $<-R_{11}<$ | 3.482f |
| 6.351f | $<R_{12}<$ | 6.444f |
| 3.576f | $<R_{13}<$ | 3.602f |
| 6.246f | $<R_{14}<$ | 6.345f |
| 0.971f | $<R_{15}<$ | 0.973f |
| 17.8f | $<R_{16}<$ | 20f |
| 25.8f | $<-R_{17}<$ | 28f |
| 6.234f | $<R_{18}<$ | 6.272f |
| 0.343f | $<t_1<$ | 0.372f |
| 0.895f | $<t_2<$ | |
| 0.970f | | |

| | | |
|---|---|---|
| 0.435f | <t_3< | 0.471f |
| 0.186f | <t_4< | 0.202f |
| 0.311f | <t_5< | 0.319f |
| 0.314f | <t_6< | 0.340f |
| 0.187f | <t_7< | 0.203f |
| 0.013f | <t_8< | 0.128f |
| 0.504f | <t_9< | 0.547f |
| 0.017f | <S_1< | 0.022f |
| 0.141f | <S_2< | 0.144f |
| 0.005f | <S_3< | 0.009f |
| 0.172f | <S_4< | 0.176f |
| 0.054f | <S_5< | 0.066f |
| 0.214f | <S_6< | 0.218f |
| 3.630f | <S_7< | 3.640f |
| 1.336f | <S_8< | 1.361f |
| 1.718f | <n_{D1}< | 1.722 |
| 1.689f | <n_{D2}< | 1.693 |
| 1.689 | <n_{D3}< | 1.693 |
| 1.718 | <n_{D4}< | 1.722 |
| 1.689 | <n_{D5}< | 1.693 |
| 1.689 | <n_{D6}< | 1.693 |
| 1.718 | <n_{D7}< | 1.722 |
| 1.515 | <n_{D8}< | 1.519 |
| 1.718 | <n_{D9}< | 1.722 |
| 27.3 | <$\nu_1$< | 31.3 |
| 52.8 | <$\nu_2$< | 56.8 |
| 52.8 | <$\nu_3$< | 56.8 |
| 27.3 | <$\nu_4$< | 31.3 |
| 52.8 | <$\nu_5$< | 56.8 |
| 52.8 | <$\nu_6$< | 56.8 |
| 27.3 | <$\nu_7$< | 31.3 |
| 62.5 | <$\nu_8$< | 66.5 |
| 44.0 | <$\nu_9$< | 48.0 |

I claim:

1. The inverted telephoto lens having long and short conjugates comprising nine mutually airspaced elements which are, beginning on the short conjugate side, a plano concave lens I concave to the short conjugate side, a plano convex lens II convex to the long conjugate side, a biconvex lens III, a biconcave lens IV, a biconvex lens V, another biconvex lens VI, a negative meniscus lens VII concave to the short conjugate side, said aforementioned lenses forming a positive group, and another negative meniscus lens VIII concave to the short conjugate side, and a biconvex lens IX the last two mentioned lenses comprising a negative group widely airspaced from said positive group and having construction data substantially as follows;

wherein the radii R, thicknesses t, and spaces S are ratioed to the overall focal length f of the lens; negative radii are centered toward the long conjugate; and the refractive indices $n_D$ and dispersions $\nu$, as well as the other values, are subnumerated increasing toward the long conjugate:

| | | | | |
|---|---|---|---|---|
| VIII | $R_{15}$ | 0.972f | $t_8$ | 0.116f |
| | $R_{16}$ | 18.537f | $t_9$ | 0.526f |
| IX | $-R_{17}$ | 26.801f | $S_8$ | 1.349f |
| | $R_{18}$ | 6.257f | | |
| | $n_{D8}$ | 1.517 | $\nu_8$ | 64.5 |
| | $n_{D9}$ | 1.720 | $\nu_9$ | 46.0 |

2. An inverted telephoto lens having long and short conjugates comprising nine mutually airspaced elements described by radii, R, thicknesses t, refractive indices $n_D$, dispersions $\nu$, and separated by spaces S, said R, t, and S values being ratios of the focal length f of said lens, said radii being taken as negative if centered toward said long conjugate and all of said values being subnumerated increasing toward said long conjugate, said elements being defined in order toward said long conjugate as:

a plano concave lens I, concave toward said short conjugate, having $R_1$, $R_2$, $t_1$, $n_{D1}$ and $\nu_1$;

a plano convex lens II, convex toward said long conjugate, spaced $S_1$ from said lens I, having $R_3$, $R_4$, $t_2$, $n_{D2}$ and $\nu_2$;

a biconvex lens III spaced $S_2$ from said lens II, having $R_5$, $R_6$, $t_3$, $n_{D3}$ and $\nu_3$;

a biconcave lens IV, spaced $S_3$ from said lens III, having $R_7$, $R_8$, $t_4$, $n_{D4}$ and $\nu_4$;

a biconvex lens V, spaced $S_4$ from said lens IV, having $R_9$, $R_{10}$, $t_5$, $n_{D5}$ and $\nu_5$;

a biconvex lens VI, spaced $S_5$ from said lens V, having $R_{11}$, $R_{12}$, $t_6$, $n_{D6}$ and $\nu_6$;

a negative meniscus lens VII concave toward said short conjugate spaced $S_6$ from said lens VI, having $R_{13}$, $R_{14}$, $t_7$, $n_{D7}$ and $\nu_7$;

a negative meniscus lens VIII, concave toward said short conjugate, spaced $S_7$ from said lens VII, having $R_{15}$, $R_{16}$, $t_8$, $n_{D8}$ $\nu_8$; and a biconvex lens IX spaced $S_8$ from said lens VIII, having $R_{17}$, $R_{18}$, $t_9$, $n_{D9}$ and $\nu_9$;

said values falling within the ranges given in the table below:

| | | |
|---|---|---|
| 1.552f | <$R_1$< | 1.555f |
| 100f | <$R_2$< | -100f |
| 100f | <$R_3$< | -100f |
| 1.269f | <$R_4$< | 1.275f |
| 32.99f | <$R_5$< | 35.26f |
| 1.885f | <$R_6$< | 1.893f |
| 1.886f | <$R_7$< | 1.892f |
| 3.833f | <$-R_8$< | 3.872f |
| 4.163f | <$-R_9$< | 4.201f |
| 3.753f | <$R_{10}$< | 3.787f |
| 3.457f | <$-R_{11}$< | 3.482f |
| 6.351f | <$R_{12}$< | 6.444f |
| 3.576f | <$R_{13}$< | 3.602f |
| 6.246f | <$R_{14}$< | 6.345f |
| .971f | <$R_{15}$< | 0.973f |
| 17.8f | <$R_{16}$< | 20f |
| 25.8f | <$-R_{17}$< | 28f |
| 6.234f | <$R_{18}$< | 6.272f |
| 0.343f | <$t_1$< | 0.372f |
| 0.895f | <$t_2$< | 0.970f |
| 0.435f | <$t_3$< | 0.471f |
| 0.186f | <$t_4$< | 0.202f |
| 0.311f | <$t_5$< | 0.319f |
| 0.314f | <$t_6$< | 0.340f |
| 0.187f | <$t_7$< | 0.203f |
| 0.103f | <$t_8$< | 0.128f |
| 0.504f | <$t_9$< | 0.547f |
| 0.017f | <$S_1$< | 0.022f |
| 0.141f | <$S_2$< | 0.144f |
| 0.005f | <$S_3$< | 0.009f |
| 0.172f | <$S_4$< | 0.176f |
| 0.054f | <$S_5$< | 0.066f |
| 0.214f | <$S_6$< | 0.218f |
| 3.630f | <$S_7$< | 3.640f |
| 1.336f | <$S_8$< | 1.361f |
| 1.718 | <$n_{D1}$< | 1.722 |
| 1.689 | <$n_{D2}$< | 1.693 |
| 1.689 | <$n_{D3}$< | 1.693 |
| 1.718 | <$n_{D4}$< | 1.722 |
| 1.689 | <$n_{D5}$< | 1.693 |
| 1.689 | <$n_{D6}$< | 1.693 |
| 1.718 | <$n_{D7}$< | 1.722 |
| 1.515 | <$n_{D8}$< | 1.519 |
| 1.718 | <$n_{D9}$< | 1.722 |
| 27.3 | <$\nu_1$< | 31.3 |
| 52.8 | <$\nu_2$< | 56.8 |
| 52.8 | <$\nu_3$< | 56.8 |
| 27.3 | <$\nu_4$< | 31.3 |
| 52.8 | <$\nu_5$< | 56.8 |
| 52.8 | <$\nu_6$< | 56.8 |
| 27.3 | <$\nu_7$< | 31.3 |
| 62.5 | <$\nu_8$< | 66.5 |
| 44.0 | <$\nu_9$< | 48.0 |

3. The lens of claim 2 having the following values:

| | | | | |
|---|---|---|---|---|
| I | $R_1$ | 1.554f | $t_1$ | 0.359f |
| | $R_2$ | ∞ | $t_2$ | 0.930f |
| II | $R_3$ | ∞ | $t_3$ | 0.454f |

|     |           |          |         |          |
|-----|-----------|----------|---------|----------|
| III | $R_4$     | 1.272f   | $t_4$   | 0.194f   |
|     | $R_5$     | 34.2f    | $t_5$   | 0.315f   |
| IV  | $R_6$     | 1.890f   | $t_6$   | 0.328f   |
|     | $R_7$     | 1.890f   | $t_7$   | 0.195f   |
| V   | $-R_8$    | 3.853f   | $t_8$   | 0.116f   |
|     | $-R_9$    | 4.184f   | $t_9$   | 0.526f   |
| VI  | $R_{10}$  | 3.771f   | $S_1$   | 0.019f   |
|     | $-R_{11}$ | 3.469f   | $S_2$   | 0.143f   |
| VII | $R_{12}$  | 6.398f   | $S_3$   | 0.006f   |
|     | $R_{13}$  | 3.591f   | $S_4$   | 0.174f   |
|     | $R_{14}$  | 6.298f   | $S_5$   | 0.060f   |
| VIII| $R_{15}$  | 0.972f   | $S_6$   | 0.216f   |
|     | $R_{16}$  | 18.537f  | $S_7$   | 3.636f   |
| IX  | $-R_{17}$ | 26.801f  | $S_8$   | 1.349f   |
|     | $R_{18}$  | 6.257f   |         |          |
|     | $n_{D1}$  | 1.720    | $\nu_1$ | 29.3     |
|     | $n_{D2}$  | 1.691    | $\nu_2$ | 54.8     |
|     | $n_{D3}$  | 1.691    | $\nu_3$ | 54.8     |
|     | $n_{D4}$  | 1.720    | $\nu_4$ | 29.3     |
|     | $n_{D5}$  | 1.691    | $\nu_5$ | 54.8     |
|     | $n_{D6}$  | 1.691    | $\nu_6$ | 54.8     |
|     | $n_{D7}$  | 1.720    | $\nu_7$ | 29.3     |
|     | $n_{D8}$  | 1.517    | $\nu_8$ | 64.5     |
|     | $n_{D9}$  | 1.720    | $\nu_9$ | 46.0     |

\* \* \* \* \*